Oct. 30, 1934.　　　R. M. NARDONE　　　1,979,170
DRIVING MECHANISM
Filed March 6, 1931　　　2 Sheets-Sheet 1

INVENTOR
Romeo M. Nardone.
BY
McConkey & Smith
ATTORNEY

Oct. 30, 1934.                R. M. NARDONE                    1,979,170
                             DRIVING MECHANISM
                           Filed March 6, 1931          2 Sheets-Sheet 2

INVENTOR
Romeo M. Nardone.
BY McConkey & Smith
ATTORNEY

Patented Oct. 30, 1934

1,979,170

UNITED STATES PATENT OFFICE 1,979,170

DRIVING MECHANISM

Romeo M. Nardone, Orange, N. J., assignor to Eclipse Aviation Corporation, East Orange, N. J., a corporation of New Jersey Application March 6, 1931, Serial No. 520,752

8 Claims. (Cl. 74—190.5)

This invention relates to driving mechanisms and more particularly to means for varying the driving ratio between driving and driven members thereof.

An object of the invention is to provide novel means for maintaining the driven member of a driving mechanism at a constant speed of rotation, notwithstanding changes in the speed of rotation of the driving member.

A further object is to provide in a driving mechanism of the foregoing character, novel means operable in response to changes in the speed of the driving member for controlling the speed of the driven member.

A further object is to provide a driving mechanism in which the driving and driven shafts, although disposed in alignment, are nevertheless rotatable at different speeds.

Another object of the invention is to provide in a driving mechanism of the foregoing character, novel means for varying the ratio between the speed of the driving and driven members automatically in accordance with a predetermined adjustment.

A further object of the invention is to provide a driving mechanism embodying means for varying the ratio between the speed of the driving and driven members without resorting to the use of shiftable gears or similar speed changing devices.

Another object of the invention is to provide in a driving mechanism of the foregoing character, novel centrifugally operated speed control mechanism operating to maintain the driven member at a constant speed within a predetermined range of speed for the driving member.

Another object of the invention is to provide novel friction driving means for drivably connecting a prime mover, such as an engine, with an electric generator or other member to be driven.

Another object is to provide driving members of novel construction in which the component parts are compactly and symmetrically positioned and readily accessible for inspection or repair.

Other objects and advantages to be derived from the use of the invention herein disclosed reside in the interrelation and method of operation of the parts; and will become apparent upon inspection of the following specification when read with reference to the accompanying drawings wherein the preferred embodiment of the invention is illustrated. It is to be expressly understood, however, that the drawings are for the purpose of illustration only, and are not to be construed as a definition of the limits of the invention, reference being had for this purpose to the appended claims.

Figure 1:
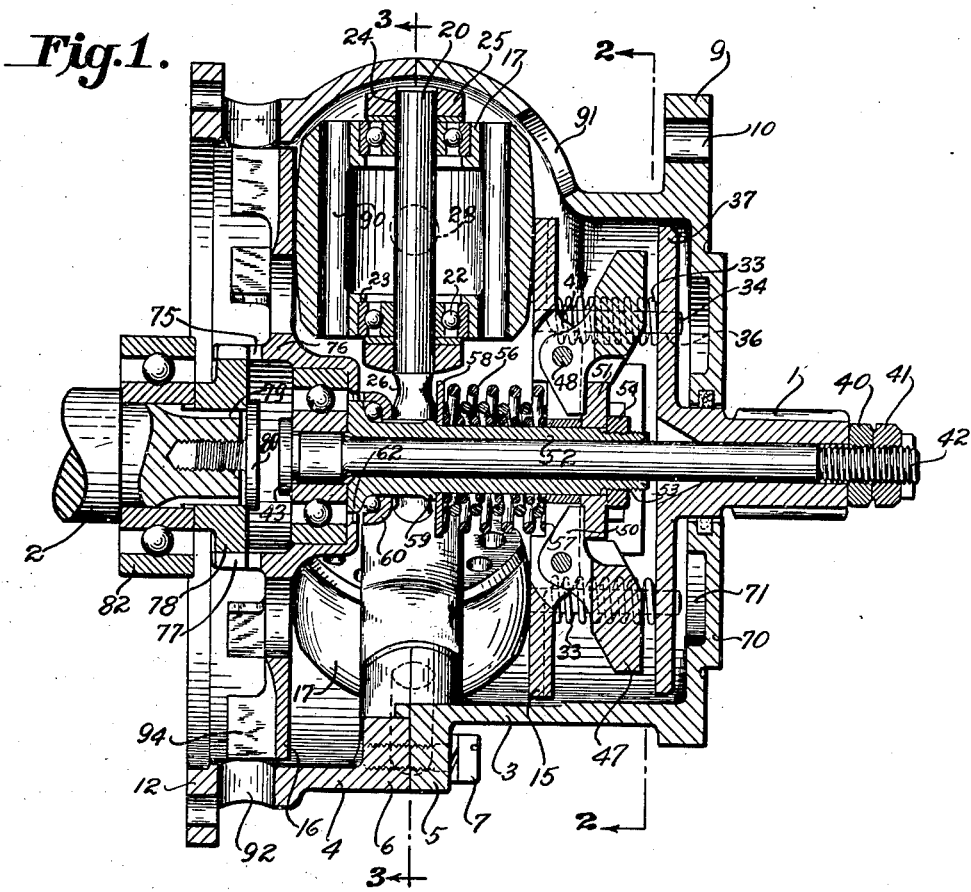
Fig. 1 is a central longitudinal section through a device embodying the invention.

Referring to the drawings, and particularly to Fig. 1, the invention is illustrated as embodied in a driving mechanism comprising a driving member 1, a driven member 2, and a plurality of intermediate members of novel construction drivably connecting the members 1 and 2, and enclosed within a casing composed of two sections 3 and 4 having marginal flanges 5 and 6 respectively, adapted to be held together by suitable means as indicated at 7. The section 3 is preferably provided with a second flange 9 having apertures 10 to facilitate mounting on any suitable support, not shown, while the section 4 has a second flange 12 similarly provided with means facilitating attachment to any suitable support.

As above suggested, the invention contemplates the provision of novel means for drivably connecting the shafts 1 and 2 to permit relative rotation of the two shafts through the instrumentality of novel friction driving connections. Such novel friction driving connections preferably comprise a pair of friction plates or discs 15 and 16 disposed in parallelism, the former being drivably associated with shaft 1 by means to be described, and the latter being drivably associated with the driven shaft 2. These friction discs 15 and 16 are adapted to cooperate with a plurality of quasi-cylindrical roller members 17 having curved spheroidal surfaces adapted to frictionally bear upon the flat surfaces of discs 15 and 16, and further adapted to oscillate about axes disposed in a plane parallel to the plane of driving disc 15, as well as being rotatable about their individual axes.

Figure 3:
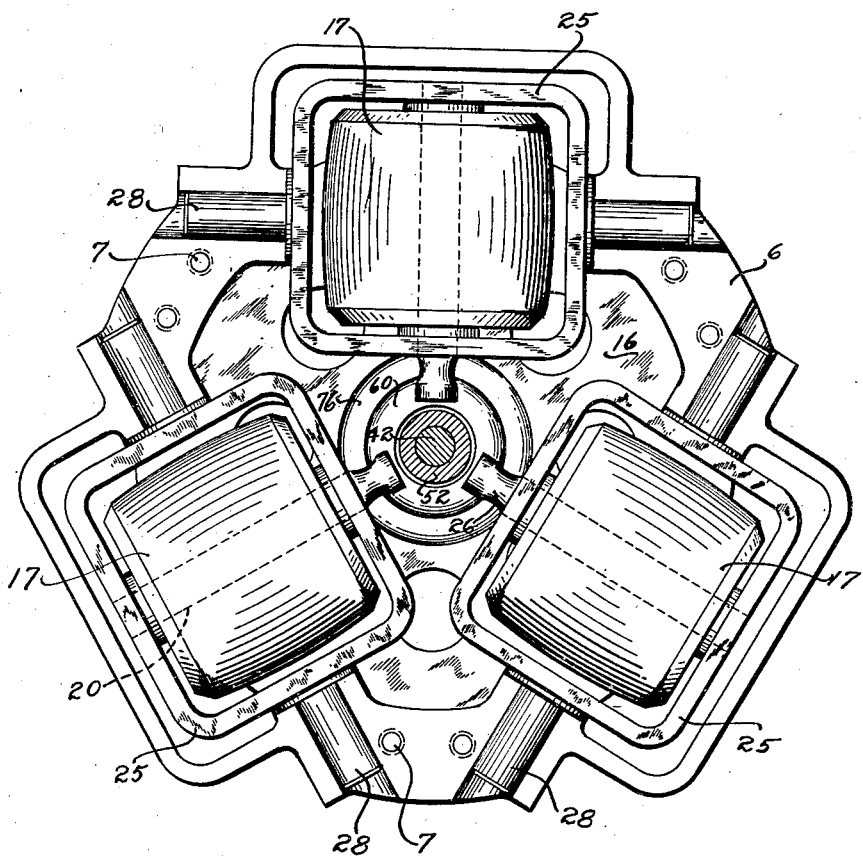
Fig. 3 is a transverse sectional view taken along the line 3—3 of Fig. 1.

Novel means whereby such combined rotation and oscillation is effected comprises the provision of a plurality of radially extending shafts or spindles 20 corresponding in number to the number of rollers 17, the spindles 20 being adapted to rotatably receive the rollers 17, the latter being provided with recessed end portions 22, (Fig. 1) for the reception of suitable bearings 23 in which the rollers 17 rotate. The outer ends of the spindles 20 are securely held in openings in retaining yokes or cradles 25, while the inner ends of the spindles are provided with concave surfaces as indicated at 26 and are adapted for limited movement along the axis of rotation of the members 1 and 2 by means to be described. The cradles 25 are in turn provided with supporting trunnions 28 extending from the sides parallel to the spindles 20 and adapted to be received in suitable openings preferably provided in the abutting faces of flanges 5 and 6 as indicated in Figs. 1 and 3. If desired, however, a separate retaining ring secured to the housing by suitable means may be employed for this purpose.

Figure 2:
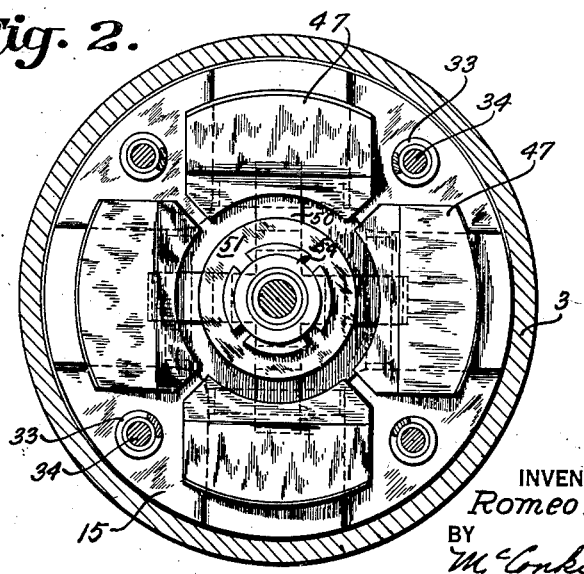
Fig. 2 is a transverse sectional view taken along the line 2—2 of Fig. 1.

Novel means are provided to cause the individual roller assemblies 17 to rotate about their corresponding spindles 20 in response to rotation of disc 15, such rotation being produced preferably by means adapted to maintain the necessary frictional pressure between the driving surface of disc 15 on the one hand and the driven spheroidal surfaces of roller 17 on the other. As illustrated, such means preferably comprises a plurality of coiled compression springs 33 disposed on pins 34 spaced angularly about the driving disc 15 at equal radial distances from its center of rotation, as indicated in Figs. 1 and 2, these pins being adapted to register at their outer ends with suitable openings 36 provided in a flange 37, preferably formed integrally with the driving shaft 1. The shaft 1 is in turn longitudinally fixed with respect to the other parts of the driving mechanism by provision of members 40 and 41 threadedly engaging the threaded end of centrally disposed mounting shaft 42, the opposite end of which is provided with a head 43 serving to hold the driving and driven members in proper relation under the influence of springs 33. It will be observed that the pressure exerted by springs 33 upon the driving surfaces of the discs 15 and the rollers 17 depends upon the setting of the adjustable nut 40 by means of which the longitudinal position of shaft 1 and its flange 37 is adjusted, the shaft being held in the adjusted position by the lock nut 41.

From the foregoing it is apparent that rotation of the driving shaft 1 will cause opposite rotation of the driven shaft 2 at a speed bearing a definite ratio to the speed of shaft 1, the driving being effected through the friction surfaces of the disc 15, the rollers 17 and the driven disc 16, the latter being drivably associated with the shaft 2 by means to be further described.

In the event of a change in the speed of rotation of driving shaft 1, the novel means now to be described function to vary the driving ratio between the discs 15 and 16 sufficiently to maintain disc 16 in rotation at a substantially constant predetermined speed. Broadly stated, the means for achieving this end comprises preferably a mechanism responsive to changes in speed to produce oscillation of the spindles 20 and roller assemblies 17 about their trunnions 28 and thereby tilt said assemblies and cause them to present new driving surfaces to the discs 15 and 16 respectively, in consequence whereof the driving ratio between said discs is varied.

In the preferred embodiment as illustrated, the novel speed responsive mechanism for effecting the result just described comprises preferably a plurality of weighted members 47 pivotally secured to the driving disc 15 by suitable means, as for example the pins 48 extending into a hub 49 formed on the driving disc, apertures for this purpose being provided at preferably evenly spaced angular distances around said hub. The weighted members or counter-weights 47 are preferably further provided with inwardly extending fingers 50 adapted to register with a collar 51 preferably rigid with a central supporting sleeve or shaft 52, the connection therebetween being effected by any suitable means, such as for example the provision of a threaded portion 53 at the end of sleeve 52, with which threaded portion the retaining nut 54 is adapted to engage. If desired, rigidity of this connection may be further assured by providing a key member or flattened section on the shaft at this point. At the opposite end the sleeve or shaft 52 is normally held in the position shown in Fig. 1 by suitable means consisting preferably of a nest of resilient compression members or springs 56 engageable at one end with a recessed portion 57 formed in disc 15 and at the opposite end with a collar 58 abutting shoulder 59 formed on the sleeve 52.

From the foregoing it is apparent that upon an increase from the normal speed of rotation of the disc 15 the resulting increase in centrifugal force will cause outward movement of the counter-weights 47 which will in turn cause the fingers 50 to exert a lateral pressure on the collar 51 to cause movement of sleeve 52 and collar 58 to the right, this movement being produced against the force of springs 56 which exert a pressure to the left in response to the reaction caused by the leftward pressure exerted on disc 15 through pins 48 by lever arms 50 of weights 47.

The novel means for effecting inclination of the rollers 17 comprises additional means mounted for movement with the sleeve 52 and engageable with the ends 26 of spindles 20 to cause oscillation of the spindles about their trunnions 28. As shown in Fig. 1 such means preferably consists of a thrust bearing member 60 rotatably mounted near the end of sleeve 52 between the ends 26 and the enlarged end 62 of the sleeve. With the provision of this member 60 it is obvious that the axial movement of sleeve 52 produced by the means above described will exert a pressure against the ends 26 to cause inclination thereof together with the roller assemblies 17, the degree and direction of inclination being proportionate to the degree of compression of the springs 56 which is in turn proportionate to the centrifugal force acting on weights 47, the latter force being in turn dependent upon the speed of the driving member 1.

Since any inclination of roller assemblies 17 will cause the spheroidal surface of such rollers to frictionally engage the driving disc 15 along a portion of the surface thereof which is closer to the axis of rotation, and will further operate to cause the rollers to engage the disc 16 along a portion of its surface which is more remote from the axis of rotation, it follows that the driving ratio will be correspondingly increased. The locus of all points of contact of each roller with the disc 15 is a circle located in a plane parallel to the pivotal axis 28 and spaced therefrom by a distance which varies directly with the degree of tilting and accordingly varies directly with the change in driving ratio. Likewise the locus of all points of contact of each roller with the disc 16 is a circle located in another plane parallel to the first-named plane and disposed on the opposite side of the pivotal axis 28, at a distance therefrom equal to one-half the distance between the two planes. As the rollers return toward the position of one-to-one driving ratio, which is indicated in Fig. 1, these two planes approach the plane of the pivotal axis 28 and finally merge therewith. In other words, at one-to-one ratio the two circles of contact become a single circle of contact, the single circle being located in the plane of the pivotal axis 28. By proper setting of the adjusting members 54 and 40, the springs 33 and 56 will be stressed just sufficiently to offer the required resistance to the counter weights 47 to produce a driving ratio which varies at such a rate that the speed of rotation of the member 16 remains substantially constant.

Inasmuch as the tilting of the rollers causes the distance between the plates 15 and 16 to increase and also causes a compression of spring 33, means are preferably provided for permitting movement of discs 15 and 16 away from each other. With respect to the disc 15, such lateral movement is possible due to the sliding fit which is preferably employed between the pins 34 and the apertures in flange 36 above referred to. With this construction it is apparent that the disc 15 and pins 34 may move to the right relatively to the plate 37, the end plate 70 of the housing being preferably recessed as indicated at 71 to permit forward movement of the pins 34.

The means for rendering similar lateral movement of the disc 16 possible preferably comprises the provision of splines 75 on the hub 76 of disc 16, such splines being engageable with corresponding splines 77 on the collar 78, the latter being rigidly secured to the driven shaft 2 by any suitable means as for example the key means indicated at 79, the axial movement being limited by suitable means such as the flat headed bolt 80 abutting collar 78 and threadedly engaging a tapped hole provided in the end of shaft 2. The shaft 2 may be rotatably supported by any desired means as for example a bearing member 82 resting on a suitable support (not shown).

The novel ventilating and heat removing means is preferably constituted by providing a plurality of tubular passages 90 (Fig. 1) through rollers 17, cooling air being drawn through openings 91 in the casing, into these passages 90, and out of the casing again through openings 92, by the blowing action of suitable ventilating members, such as blades 94, preferably located on disc 16.

There is thus provided a novel driving mechanism which is effective to maintain a driven member at constant speed, within desired limits, by the use of a compact symmetrically arranged mechanism which entails the use of comparatively few parts, and which is relatively inexpensive to manufacture, readily assembled or disassembled, and which possesses the further desirable quality that it can be adapted to a variety of uses and applications. Thus, for example, although especially useful for driving a generator or other dynamo electric machine or accessory of an automotive vehicle, it may also be applied as a drive for any machinery where a constant speed is desirable and where the prime mover is subject to variations in speed.

Moreover, the invention may be utilized as a variable ratio driving mechanism with or without the constant speed feature.

While the embodiment of the invention herein illustrated possesses a high degree of merit from a practical as well as from other viewpoints, it is nevertheless contemplated that changes in construction and arrangement of parts will suggest themselves to persons skilled in the art in the light of the foregoing disclosure, and it is to be understood that such means are within the scope of the invention disclosed herein. Thus, for example, in place of the counter-weight construction shown at 47, 48 and 50, other speed responsive means may be employed, such as for example, fluid pressure operated pistons or equivalent means having a stroke or range of movement depending upon the speed of rotation of the prime mover.

Likewise other changes may be made in the form, details of construction, arrangement of parts and the uses to which they are applied, without departing from the spirit of the invention or the scope of the appended claims.

What is claimed is:

1. In a device of the character described, a driving member, a driven member, means for maintaining driving relation between said members to cause rotation of said driven member at a predetermined speed, said means including a plane friction surfaced member associated with said driving member, and a spheroidal friction surfaced member having an axis of rotation normally disposed substantially at right angles to the axis of said driving member, and means for changing the angular position of said spheroidal friction surfaced member in response to a change in the speed of rotation of said driving member.

2. In a device of the class described, a driving member, a driven member, said members having driving surfaces located in parallel planes, speed varying mechanism drivably connecting said members to cause rotation of said driven member at a predetermined speed, said mechanism comprising a member rotatable with said driving member about its own axis and also rockable about an axis parallel to the planes of said driving and driven members, and means for changing the angle between said axes and at the same time changing the circle of contact of said rockable member with said driving and driven members into two circles of contact, one of which is traced by said driving member and the other traced on said driven member, the two circles being located in parallel planes on opposite sides of the plane passing through the last-named axis, said last-named means being operable in response to changes in the speed of rotation of said driving member.

3. A variable ratio driving mechanism comprising a plane driving surface, a plane driven surface disposed in parallelism with said driving surface, a plurality of members adapted to establish driving relation between said driving and driven members, each of said members having a spheroidal surface the elements of which describe an arc of radius greater than the distance between said driving and driven surfaces, said members being rotatable about axes normally disposed in parallelism with said driving and driven surfaces, means for oscillating said members about axes disposed at right angles to the said axis of rotation to vary the driving ratio as well as the distance between said plane surfaces and means for maintaining said plane surfaces in frictional driving relation to said spheroidal surface notwithstanding the degree of oscillation of said connecting members.

4. In a variable ratio driving mechanism, a driving disc, a driven disc, each of said discs having a plane surface disposed substantially in parallelism with the plane surface of the other, means for establishing driving relation between said plane surfaces comprising a housing surrounding said discs and provided with trunnions journaled therein, a plurality of drive transmitting members mounted on said trunnions and having spheroidal surfaces adapted to engage said driving and driven discs and be rotated by such engagement in response to rotation of said driving disc, means for swinging said drive transmitting members on said trunnions to vary the distance between said driving and driven discs and to simultaneously convert the single circle of contact formerly described by each drive transmitting member, into two circles of contact located in parallel planes separated by a distance which varies with the variation of the distance between the driving and driven discs, said last-named means thereby operating to produce corresponding changes in the driving ratio, and means for maintaining the driving relation between said discs during the operation of said last named means.

5. In a variable ratio driving mechanism, a disc having a plane driving surface, a second disc having a plane driven surface, disposed substantially in parallelism with said first-named plane surface, means for establishing driving relation between said surfaces comprising a housing surrounding said discs and provided with trunnions journaled therein, a plurality of drive transmitting members mounted on said trunnions and having spheroidal surfaces adapted to engage said driving and driven discs in a single circle of contact located in a plane passing through the axis of the corresponding trunnions and be rotated by such engagement, means operating in response to changes in the speed of rotation of said driving disc to swing said drive transmitting members on said trunnions to vary the distance between said driving and driven discs to produce corresponding changes in the driving ratio therebetween, and means for maintaining the driving relation between said discs during the operation of said last named means.

6. In a variable ratio driving mechanism, a disc having a plane surface, a second disc having a plane driven surface disposed substantially in parallelism with said first-named plane surface, means for establishing driving relation between said surfaces comprising a housing surrounding said discs and provided with trunnions journaled therein, a plurality of drive transmitting members mounted on said trunnions and having spheroidal surfaces adapted to engage said driving and driven discs in a single circle of contact located in a plane passing through the axis of the corresponding trunnions and be rotated by such engagement in response to rotation of said driving disc, means operable in response to changes in the speed of rotation of said driving disc to swing said drive transmitting members on said trunnions to vary the distance between said driving and driven discs to produce corresponding changes in the driving ratio therebetween, and means for maintaining the driving relation between said discs during the operation of said last named means, said swinging means comprising weighted members pivotally secured to said driving disc so as to swing about said disc by centrifugal action, and means for transferring the oscillation of said weighted members to said drive transmitting members.

7. In a variable ratio driving mechanism, a disc having a plane driving surface, a second disc having a plane driven surface disposed substantially in parallelism with said first-named plane surface, means for establishing driving relation between said surfaces comprising a housing surrounding said discs and provided with trunnions journaled therein, a plurality of drive transmitting members mounted on said trunnions and having spheroidal surfaces adapted to engage said driving and driven discs in a single circle of contact located in a plane passing through the axis of the corresponding trunnions and be rotated by such engagement in response to rotation of said driving disc, means operable in response to changes in the speed of rotation of said driving disc to swing said drive transmitting members on said trunnions to vary the distance between said driving and driven discs to produce corresponding changes in the driving ratio therebetween, means for maintaining the driving relation between said discs during the operation of said last named means, and resilient means constantly tending to return said drive transmitting members to a position of parallelism with respect to said discs.

8. In a device of the class described, in combination with driving and driven members having opposing friction surfaces disposed substantially in parallelism and at right angles to their common axis of rotation, means for drivably connecting said driving and driven members to cause the former to drive the latter at a substantially constant speed irrespective of the speed of rotation of said driving member, said means comprising a roller engaging said friction surface along a single circle of contact when the distance between said opposing friction surface is smallest, and along separate circles of contact with respect to each of said surfaces in the event of an increase in the distance between said opposing friction surface due to a change in the rotary speed of said driving member.

ROMEO M. NARDONE.